US012743624B2

(12) United States Patent
Zhang et al.

(10) Patent No.: US 12,743,624 B2
(45) Date of Patent: Sep. 22, 2026

(54) METHOD FOR TRAINING NEURAL NETWORK MODEL BASED ON POWER EXPONENTIAL DOMAIN FIXED-POINT ENCODING

(71) Applicant: Hangzhou Hikvision Digital Technology Co., Ltd., Hangzhou (CN)

(72) Inventors: Yuan Zhang, Hangzhou (CN); Di Xie, Hangzhou (CN); Shiliang Pu, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 1138 days.

(21) Appl. No.: 17/763,472

(22) PCT Filed: Sep. 25, 2020

(86) PCT No.: PCT/CN2020/117902
§ 371 (c)(1),
(2) Date: Mar. 24, 2022

(87) PCT Pub. No.: WO2021/057926
PCT Pub. Date: Apr. 1, 2021

(65) Prior Publication Data

US 2022/0366262 A1 Nov. 17, 2022

(30) Foreign Application Priority Data

Sep. 25, 2019 (CN) ......................... 201910909494.8

(51) Int. Cl.
*G06N 3/063* (2023.01)
*G06F 7/483* (2006.01)
(Continued)

(52) U.S. Cl.
CPC ............. *G06N 3/084* (2013.01); *G06F 7/483* (2013.01); *G06N 3/045* (2023.01); *G06N 3/0464* (2023.01); *G06N 3/0495* (2023.01); *G06N 3/09* (2023.01)

(58) Field of Classification Search
CPC ........ G06N 3/084; G06N 3/045; G06N 3/063; G06N 3/08; G06N 3/0464; G06N 3/0495; G06N 3/09; G06F 7/483
See application file for complete search history.

(56) References Cited

U.S. PATENT DOCUMENTS 11,295,196 B2 * 4/2022 Chen et al. .............. G06N 3/02
2005/0065990 A1 3/2005 Allen
(Continued)

FOREIGN PATENT DOCUMENTS

CN 106066783 11/2016
CN 107633511 1/2018
(Continued)

OTHER PUBLICATIONS

Boue, "Deep learning for pedestrians: backpropagation in CNNs", 2018, pp. 1-44, https://arxiv.org/abs/1811.11987 (Year: 2018).*
(Continued)

*Primary Examiner* — Viker A Lamardo
*Assistant Examiner* — Paul M Galvin-Siebenaler
(74) *Attorney, Agent, or Firm* — NORTON ROSE FULBRIGHT US LLP

(57) ABSTRACT

The embodiments of the present disclosure provides a method and an apparatus for training a neural network model, A training sample is obtained, and the neural network model is trained using the training sample. When the neural network model is trained, power exponential domain fixed-point encoding is performed on a first activation inputted into each network layer and a network weight of each
(Continued)

network layer, and an encoded first activation and an encoded network weight are power exponential domain fixed-point data, which when used in the operation, can cause a matrix multiplication operation involved to be converted into an addition operation in the power exponential domain by means of the power exponential domain encoding. The hardware resources required for the addition operation are significantly less than that required for the multiplication operation, which therefore can greatly reduce the hardware resource overhead required for running the neural network model.

6 Claims, 6 Drawing Sheets

(51) Int. Cl.

| | |
|---|---|
| ***G06N 3/045*** | (2023.01) |
| ***G06N 3/0464*** | (2023.01) |
| ***G06N 3/0495*** | (2023.01) |
| ***G06N 3/08*** | (2023.01) |
| ***G06N 3/084*** | (2023.01) |
| ***G06N 3/09*** | (2023.01) |

(56) References Cited

U.S. PATENT DOCUMENTS

| | | | |
|---|---|---|---|
| 2012/0023149 | A1 | 1/2012 | Kinsman et al. |
| 2017/0286830 | A1 | 10/2017 | El-Yaniv et al. |
| 2017/0323197 | A1 | 11/2017 | Gibson et al. |
| 2018/0239992 | A1 | 8/2018 | Chalfin et al. |
| 2018/0322607 | A1 | 11/2018 | Mellempudi et al. |
| 2019/0228284 | A1 | 7/2019 | Holland |

FOREIGN PATENT DOCUMENTS

| | | |
|---|---|---|
| CN | 108229657 | 6/2018 |
| CN | 108932124 | 12/2018 |
| CN | 109754063 | 5/2019 |
| CN | 109816092 | 5/2019 |
| CN | 109993276 | 7/2019 |
| CN | 110245753 | 9/2019 |
| WO | WO 2018/084941 | 5/2018 |
| WO | WO 2019/127480 | 7/2019 |

OTHER PUBLICATIONS

Harron er al., “Neural Network Approach to a Classic Image Recognition Problem”, May 2008, pp. 001503-001506, https://doi.org/10.1109/CCECE.2008.4564792 (Year: 2008).*

Chen et al., “FxpNet: Training a Deep Convolutional Neural Network in Fixed-Point Representation”, 2017, International Joint Conference on Neural Networks (IJCNN), IEEE Xplore, pp. 2494-2501 (Year: 2017).*

D’Acremont et al., “CNN-Based Target Recognition and Identification for Infrared Imaging in Defense Systems”, Apr. 30, 2019, Sensors, 19, 2040, pp. 1-16 (Year: 2019).*

Van Veen, “The Neural Network Zoo”, 2016, The Asimov Institute, https://www.asimovinstitute.org/neural-network-zoo/ (Year: 2016).*

Lai et al, “Deep Convolutional Neural Network Inference with Floating-point Weights and Fixed-point Activations”, Mar. 8, 2017, arXiv.com, arXiv:1703.03073v1 [cs.LG], pp. 1-10 (Year: 2017).*

Hubara et al, “Quantized Neural Networks: Training Neural Networks with Low Precision Weights and Activations”, Sep. 22, 2016 , arXiv.com, arXiv:1609.07061v1 [cs.NE], pp. 1-29 (Year: 2016).*

Office Action issued in corresponding Chinese Application No. 201910909494.8, dated Jun. 7, 2023.

The Application and Research of Distributed Database Inquiry about Optimum, *Journal of Nanchang University* (*Engineering and Technology*), vol. 27, No. 2, 2005, 5 pages (English Abstract provided).

Extended European Search Report issued in Counterpart European Application No. 20869529.6, dated Nov. 14, 2022.

Miyashita, Daisuke, Edward H. Lee, and Boris Murmann. “Convolutional Neural Networks Using Logarithmic Data Representation.” arXiv preprint arXiv:1603.01025 (2016), 10 pages.

International Search Report and Written Opinion issued in Corresponding PCT Application No. PCT /CN2020/117902, dated Dec. 21, 2020 (English Translation provided).

* cited by examiner

METHOD FOR TRAINING NEURAL NETWORK MODEL BASED ON POWER EXPONENTIAL DOMAIN FIXED-POINT ENCODING

CROSS REFERENCE TO RELATED APPLICATIONS

The present application is a national phase application under 35 U.S.C. § 371 of International Application No. PCT/CN2020/117902, filed Sep. 25, 2020, which claims the benefit of priority to Chinese patent application No. 201910909494.8, filed with the China National Intellectual Property Administration on Sep. 25, 2019 and entitled "METHOD AND APPARATUS FOR TRAINING NEURAL NETWORK MODEL", each of which are incorporated herein by reference in their entirety.

TECHNICAL FIELD

The present disclosure relates to the technical field of machine learning, in particular to a method and an apparatus for training a neural network model.

BACKGROUND

A deep neural network, as an emerging field in machine learning research, analyzes data by imitating the mechanism of human brain, and is an intelligent model for analysis and learning by establishing and simulating the human brain. At present, the deep neural network, such as a convolution neural network, a recurrent neural network, a long-short term memory network, etc., has been well applied in many types of data processing technologies. For example, it has been well applied in the field of video image processing, for the detection and segmentation of target objects in images and the behavior detection and recognition, and in the field of audio data processing, for the speech recognition and other aspects.

At present, due to the large amount of data of image data or audio data to be processed, in order to ensure the convergence precision of the neural network model, the training of the neural network model usually employs single-precision floating point data for operations. However, due to a high bit width of the single-precision floating point data, the amount of data involved in the operations is large, resulting in high hardware resource overhead required for running the neural network model.

SUMMARY

The purpose of the embodiments of the present disclosure is to provide a method and an apparatus for training a neural network model, so as to reduce the hardware resource overhead required for running the neural network model. Specific technical solutions are as follows:

In a first aspect, an embodiment of the present disclosure provides a method for training a neural network model, which includes:

obtaining a training sample; and training the neural network model using the training sample; wherein, when training the neural network model, for each network layer in the neural network model, following steps are respectively executed:

obtaining a first activation inputted into the network layer and a network weight of the network layer;

performing power exponential domain fixed-point encoding on the first activation and the network weight, to encode the first activation and the network weight into power exponential domain fixed-point data; and calculating a second activation outputted by the network layer according to an encoded first activation and an encoded network weight.

In a second aspect, an embodiment of the present disclosure provides an apparatus for training a neural network model, which includes:

an obtaining module configured to obtain a training sample; and a training module configured to train the neural network model using the training sample, wherein, when training the neural network model, the training module is configured to execute following steps, respectively for each network layer in the neural network model:

obtaining a first activation inputted into the network layer and a network weight of the network layer;

performing power exponential domain fixed-point encoding on the first activation and the network weight, to encode the first activation and the network weight into power exponential domain fixed-point data; and calculating a second activation outputted by the network layer according to an encoded first activation and an encoded network weight.

In a third aspect, an embodiment of the present disclosure provides a computer device, including a processor and a machine readable storage medium, wherein the machine readable storage medium stores machine executable instructions that can be executed by the processor, which when executed by the processor, cause the processor to implement the method provided in the first aspect of the embodiment of the present disclosure.

In a fourth aspect, an embodiment of the present disclosure provides a machine readable storage medium with machine executable instructions stored thereon, which when invoked and executed by a processor, cause the processor to implement the method provided in the first aspect of the embodiment of the present disclosure.

In a fifth aspect, an embodiment of the present disclosure provides a computer program product configured to implement the method at runtime provided in the first aspect of the embodiment of the present disclosure.

According to the method and the apparatus for training the neural network model provided by the embodiments of the present disclosure, a training sample is obtained, and a neural network model is trained using the training sample. When the neural network model is trained, following steps are respectively performed for each network layer in the neural network model: obtaining a first activation inputted into a network layer and a network weight of the network layer; performing power exponential domain fixed-point encoding on the first activation and the network weight, to encode the first activation and the network weight into power exponential domain fixed-point data; and calculating, according to an encoded first activation and an encoded network weight, a second activation outputted by the network layer. During training of the neural network model, the power exponential domain fixed-point encoding is performed on the first activation inputted into each network layer and the network weight of each network layer, and the encoded first activation and encoded network weight are power exponential domain fixed-point data, which when used in the operation, can cause a matrix multiplication operation involved to be converted into an addition operation in the power exponential domain by means of the power exponential domain encoding. The hardware resources required for the addition operation are significantly less than that required for the multiplication operation, which therefore can greatly reduce the hardware resource overhead required for running the neural network model.

BRIEF DESCRIPTION OF THE DRAWINGS

In order to more clearly describe the technical solutions of the disclosure and those of the prior art, drawings used to illustrate the disclosure and the prior art will be briefly described below. It should be understood that the drawings below are illustrated by way of example only. Those of ordinary skill in the art can obtain further drawings based on these drawings without any creative efforts.

DETAILED DESCRIPTION

In order to make objectives, technical solutions and advantages of the present disclosure more apparent, the present disclosure now will be described in detail with reference to the accompanying drawings and the detailed description. Obviously, the embodiments described are only some of the embodiments of the present disclosure instead of all the embodiments. All further embodiments obtained by those of ordinary skills in the art based on the embodiments herein without any creative efforts are within the scope of the present disclosure.

In order to reduce the hardware resource overhead required for running a neural network model, the embodiments of the present disclosure provide a method and an apparatus for training a neural network model, a computer device and a machine readable storage medium. The method for training the neural network model according to the embodiments of the present disclosure will be described below first.

An implementation subject of the method for training the neural network provided in the embodiment of the present disclosure may be a computer device having a function of training the neural network model, or a computer device that implements functions such as target detection and segmentation, behavior detection and recognition, and speech recognition. It may also be a camera having functions such as target detection and segmentation, behavior detection and recognition, or a microphone having a voice recognition function, and the implementation subject at least includes a core processing chip with data processing capability. The way of implementing the method for training the neural network provided in the embodiments of the present disclosure may be at least by one of software, hardware circuits, and logic circuits provided in the implementation subject.

Figure 1:
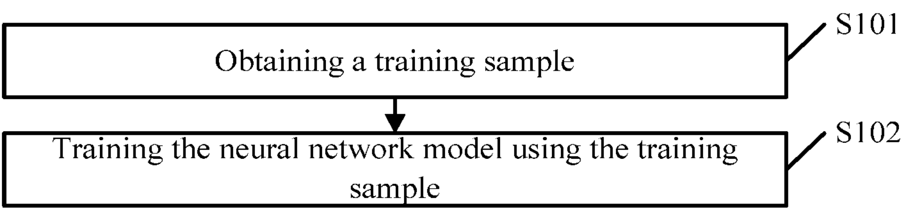
FIG. 1 is a schematic flowchart of a method for training a neural network model according to an embodiment of the present disclosure.

As shown in FIG. 1, the method for training the neural network model provided by the embodiment of the present disclosure may include the following steps.

S101, obtaining a training sample.

When the neural network is trained, it is usually necessary to collect a large number of training samples. Based on different functions that need to be implemented by the neural network model, the training samples collected are also different. For example, if it is intended to train a detection model for the face detection, the training samples collected will be face samples; and if it is intended to train a recognition model for the vehicle recognition, the training samples collected will be vehicle samples.

S102, training a neural network model using the training sample.

The training sample is inputted into the neural network model, a BP (Back Propagation) algorithm or other model training algorithms is used to perform operations on the training sample, an operation result is compared with a set nominal value, and network weights of the neural network model are adjusted. By inputting different training samples into the neural network model in turn, above steps are performed iteratively, and the network weights are continuously adjusted. An output of the neural network model will be getting closer to the nominal value, until the difference between the output of the neural network model and the nominal value is small enough (for example, less than a preset threshold), or when the output of the neural network model converges, it is considered that the training of the neural network model is completed.

Figure 2:
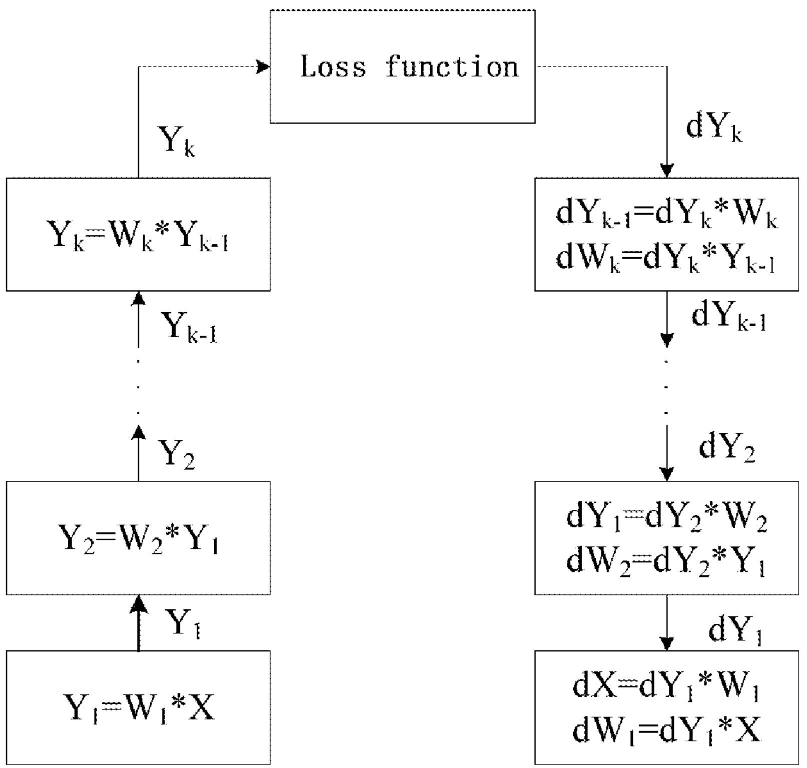
FIG. 2 is a schematic diagram of a process of training a neural network model according to an embodiment of the present disclosure.

Taking the BP algorithm as an example, main computing operations and data flow in the process of training the neural network model are shown in FIG. 2. For each network layer, a convolution operation Yi=Wi*Yi−1 is mainly performed during a forward operation, and a convolution operation dYi−1=dYi−1*Wi and a matrix multiplication operation dWi=dYi*Yi−1 are mainly performed during a backward operation. Herein, the forward operation refers to an operation sequence starting from a first network layer and conducting from front to back, and the backward operation refers to an operation sequence starting from a last network layer and conducting from back to front. Wi represents a network weight of an $i^{th}$ network layer, such as convolution layer parameters or fully connected layer parameters, Yi represents an activation inputted into the $i^{th}$ network layer or outputted by the $i^{th}$ network layer, dWi represents a weight gradient corresponding to the $i^{th}$ network layer, and dYi represents an activation gradient inputted into the $i^{th}$ network layer.

As shown in FIG. 2, in the process of training the neural network model using the BP algorithm, the training sample X is input into the neural network model, and in the forward operation of the neural network model, k network layers perform a convolution operation in turn from front to back to obtain a model output Yk. The output of the model is compared with the nominal value through a loss function to obtain a loss value dYk. Then in the backward operation of the neural network model, the k network layers perform a convolution operation and a matrix multiplication operation in turn from back to front to obtain a weight gradient corresponding to each network layer, and the network weight is adjusted according to the weight gradient. By means of continuous iterative process, the output of the neural network model is getting closer to the nominal value.

Figure 3:
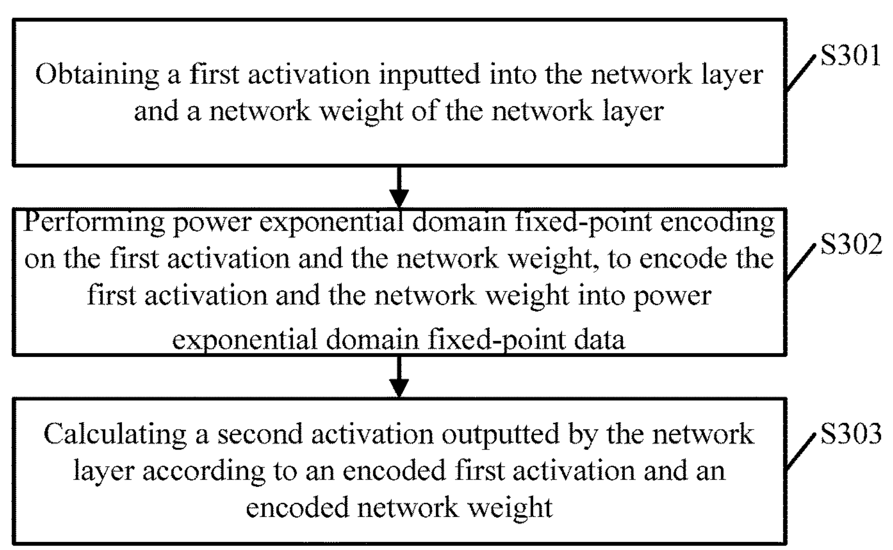
FIG. 3 is a schematic diagram of an execution flow for each network layer in a neural network model in the process of training the neural network model according to an embodiment of the present disclosure.

According to the embodiment of the present disclosure, in the process of training the neural network model, steps shown in FIG. 3 need to be performed respectively for each network layer in the neural network model.

S301, obtaining a first activation inputted into a network layer and a network weight of the network layer.

When performing the forward operation, the first activation inputted into the $i^{th}$ network layer is Yi, and when performing the backward operation, the first activation inputted into the $i^{th}$ network layer is dYi.

S302, performing power exponential domain fixed-point encoding on the first activation and the network weight, to encode the first activation and the network weight into power exponential domain fixed-point data.

For the $i^{th}$ network layer, the power exponential domain fixed-point encoding is performed on the first activation Yi, dYi, and the network weight Wi of the network layer. The power exponential domain fixed-point encoding is to encode the data in floating-point format into the data in power exponential domain fixed-point format.

In an implementation of the embodiment of the present disclosure, S302 may specifically be: encoding each scalar value in the first activation and the network weight respectively into a product of a parameter value representing a global dynamic range and a power exponential domain fixed-point value.

The specific encoding method may be to encode each scalar value in the first activation and the network weight into the product of the parameter value sp representing the global dynamic range and the power exponential domain fixed-point value ep, where sp=2E, E is a signed binary number with a bit width of EB, EB is a set bit width, and ep is a signed binary number with a bit width of IB, which consists of one sign bit, an exponent bit and a fraction bit. The unit of bit width is Bit (bit). The power exponential domain fixed-point value ep and the parameter value sp are calculated as:

$$ep = (-1)^s 2^{Exponent} 2^{Fraction} \quad (1)$$

$$sp = 2^{(-1)^s \sum_{i=0}^{EB-2} 2^i x_i} \quad (2)$$

wherein s is the sign bit of the binary number x, which takes a value of 0 or 1, $x_i$ is the value of the $i^{th}$ bit of the binary number x, which takes the value of 0 or 1, Exponent is a binary number of the exponent bit, and Fraction is a binary number of the fraction bit.

In one implementation of the embodiment of the present disclosure, if the network layer is a convolution layer, then a size of the network weight is C×R×R×N, and for each scalar value in each three-dimensional tensor with a size of C×R×R, the corresponding parameter values are the same; if the network layer is a fully connected layer, then a size of the network weight is M×N, and for each scalar value in each column vector with a size of 1×N, the corresponding parameter values are the same; the parameter values corresponding to each scalar value in the first activation are the same.

Figure 4:
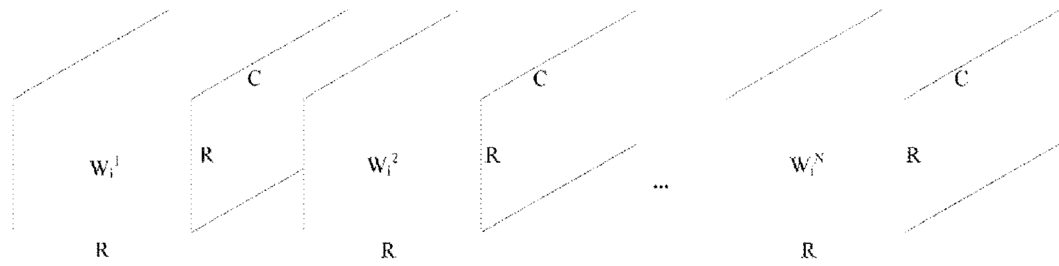
FIG. 4 is a schematic diagram of a tensor space structure corresponding to a four-dimensional tensor convolution kernel with a size of C×R×R×N according to an embodiment of the present disclosure.
Figure 5:
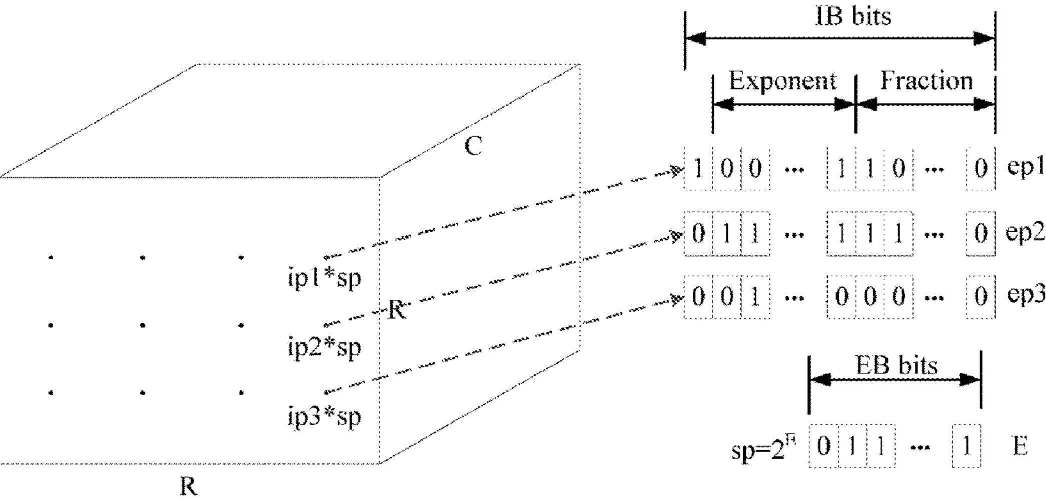
FIG. 5 is a schematic diagram of an encoding manner of each scalar value in a three-dimensional tensor with a size of C×R×R according to an embodiment of the present disclosure.

Wi is the network weight corresponding to the $i^{th}$ layer of the neural network model, and the type of the network layer is a convolution layer or a fully connected layer. If the $i^{th}$ layer is a convolution layer, then Wi is a four-dimensional tensor convolution kernel with a size of C×R×R×N, and a corresponding tensor space structure is shown in FIG. 4. In FIG. 4, C represents a dimension size of the convolution kernel in the direction of an input channel, R represents a dimension size of a space of the convolution kernel, and N represents a dimension size of the convolution kernel in the direction of an output channel. Each scalar value w in each three-dimensional tensor Wip with a size of C×R×R can be expressed as:

$$w = sp \cdot ep \quad (3)$$

wherein each three-dimensional tensor Wip shares one sp, and each scalar value w corresponds to one power exponential domain fixed-point value ep. The encoding method of each scalar value in the three-dimensional tensor with a size of C×R×R is shown in FIG. 5, and ep and sp therein can be calculated according to formulas (1) and (2), which will not be repeated here.

Figure 6:
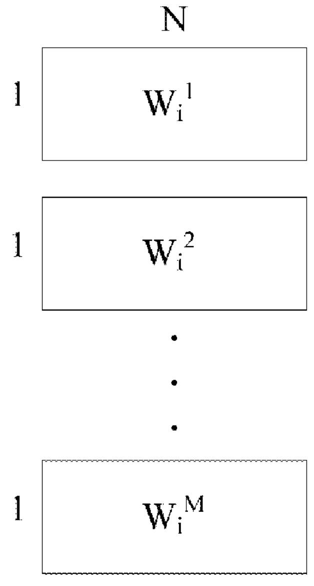
FIG. 6 is a schematic structural diagram of a tensor space corresponding to a two-dimensional matrix with a size of M×N according to an embodiment of the present disclosure.
Figure 7:
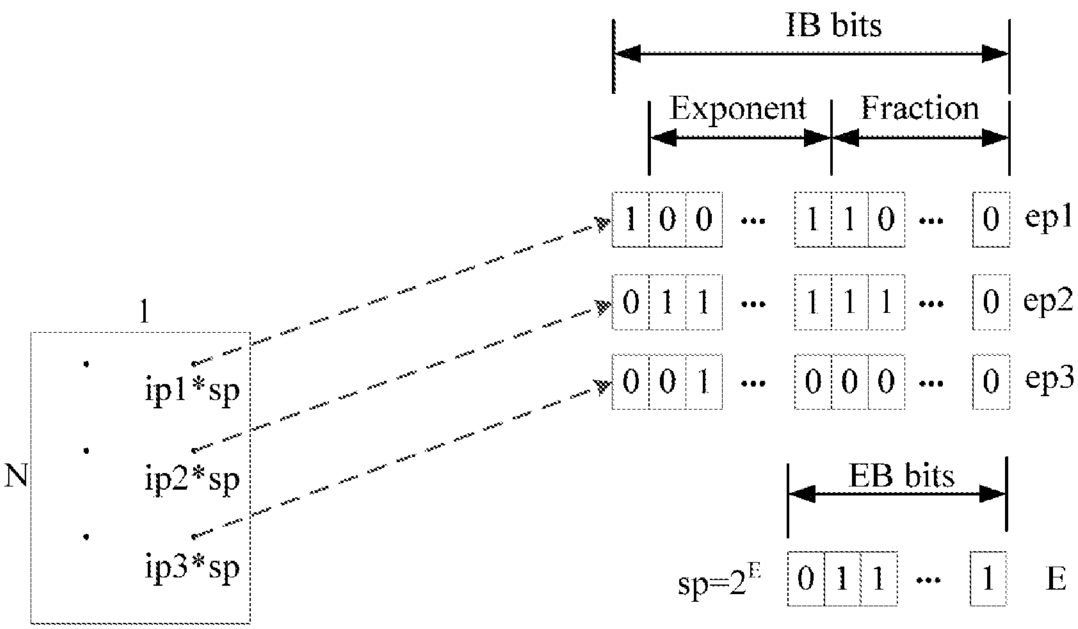
FIG. 7 is a schematic diagram of an encoding manner of each scalar value in a column vector with a size of 1×N according to an embodiment of the present disclosure.

Similarly, if the $i^{th}$ layer is a fully connected layer, then Wi is a two-dimensional matrix with a size of M×N, and a corresponding tensor space structure is shown in FIG. 6. The matrix can be divided into the following structure: the two-dimensional matrix with a size of M×N is divided into M column vectors with a size of 1×N. Each scalar value w in each column vector Wip with a size of 1×N is represented using above formula (3). Each column vector Wip shares one sp, and each scalar value w corresponds to one power exponential domain fixed-point value ep. The encoding method of each scalar value in the column vector with a size of 1×N is shown in FIG. 7, and ep and sp therein can be calculated according to formulas (1) and (2), which will not be repeated here.

Figure 8:
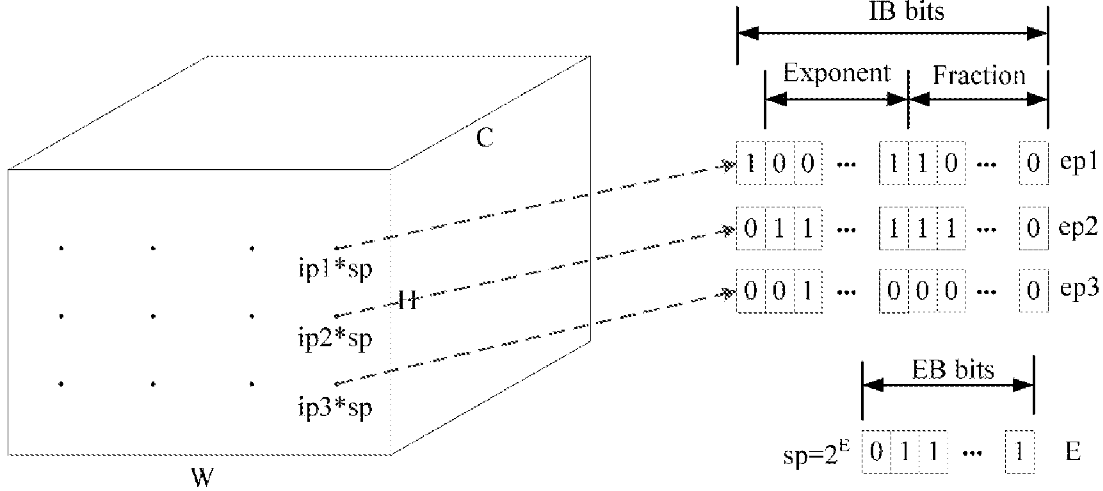
FIG. 8 is a schematic diagram of a power exponential domain fixed-point encoding method performed on an activation and each scalar value in a three-dimensional tensor of an activation gradient according to an embodiment of the present disclosure.

Yi and dYi are the activation and the activation gradient corresponding to the $i^{th}$ layer of the neural network model, and are three-dimensional tensors with a size of C×H×W. Each scalar value y or dy in the three-dimensional tensors Yi or dYi can be expressed as:

$$y = sp \cdot ep \quad (4)$$

$$dy = sp \cdot ep \quad (5)$$

wherein each three-dimensional tensor Yi or dYi shares one sp, and each scalar value y or dy corresponds to one power exponential domain fixed-point value ep. The encoding method of each scalar value in the activation and the activation gradient three-dimensional tensors is shown in FIG. 8, and ep and sp therein can be calculated according to formulas (1) and (2), which will not be repeated here.

S303, calculating a second activation outputted by the network layer according to an encoded first activation and an encoded network weight.

As described above, the power exponential domain fixed-point encoding is performed on each scalar value in both the first activation and the network weight, and the encoded data is the power domain fixed-point data, so that when performing the forward operation and the backward operation, the operations with the largest computing resource overhead involved, such as the convolution operation and matrix multiplication operation, can convert multiplication operations into addition operations in the power exponential domain through the power exponential domain encoding method, which greatly improves the training efficiency of the neural network on the hardware platform.

Specifically, in the process of training the neural network model, for any network layer in the neural network model, obtaining a first activation to be inputted into the network layer (for the first network layer in the neural network model, the first activation is the training samples inputted into the neural network model; for other network layers in the neural network model, the first activation is the input of the network layer) and a network weight of the network layer; performing power exponential domain fixed-point encoding on the first activation and the network weight, to encode the first activation and the network weight into power exponential domain fixed-point data; inputting an encoded first activation into the network layer, and performing, by the network layer, a convolution operation on the encoded first activation by using an encoded network weight, to obtain a second activation outputted by the network layer. If the network layer is not the last network layer, the second activation is used as a first activation to be inputted into the next network layer.

In one implementation of the embodiment of the present disclosure, S102 may be specifically implemented according to the following steps:

In a first step, the training sample is inputted to the neural network model, and a forward operation is performed on the training sample according to a sequence of network layers in the neural network model from front to back, to obtain a result of the forward operation of the neural network model. In performing the forward operation, for each network layer, the power exponential domain fixed-point encoding is performed respectively on the first activation inputted into the network layer and the network weight of the network layer, to encode the first activation and the network weight into power exponential domain fixed-point data, and a second activation outputted by the network layer is calculated according to an encoded first activation and an encoded network weight. A calculation is carried out by using the second activation as a first activation inputted into a next network layer until a second activation outputted by a last network layer is determined as the result of the forward operation.

In a second step, the result of the forward operation is compared with a preset nominal value to obtain a loss value.

In a third step, the loss value is inputted to the neural network model, and a backward operation is performed on the loss value according to a sequence of network layers in the neural network model from back to front, to obtain a weight gradient of each network layer in the neural network model. In performing the backward operation, for each network layer, the power exponential domain fixed-point encoding is performed respectively on the first activation and the first activation gradient inputted into the network layer, and the network weight of the network layer, to encode the first activation, the first activation gradient and the network weight into power exponential domain fixed-point data, and a second activation gradient outputted by the network layer and the weight gradient are calculated according to an encoded first activation, an encoded first activation gradient and an encoded network weight. A calculation is carried out by using the second activation gradient as a first activation gradient inputted into a next network layer until the weight gradients of all network layers are calculated.

In a fourth step, the network weight of each network layer is adjusted according to the weight gradient of each network layer.

The above-mentioned process from the first step to the fourth step is the operation process of the BP algorithm, and these four steps are executed in a continuous loop to realize the training of neural network model. The process of the forward operation is to calculate the second activation Yi through multiplication of the first activation and the network weight Yi=Wi*Yi−1, and the process of the backward operation is to calculate the second activation gradient dYi−1 through multiplication of the first activation gradient and the network weight dYi−1=dYi−1*Wi, and calculate the weight gradient dWi through multiplication of the first activation gradient and the first activation dWi=dYi*Yi−1.

In one implementation of the embodiment of the present disclosure, the fourth step mentioned above may be specifically implemented according to the following steps: performing integer fixed-point encoding on the network weight and the weight gradient of each network layer, to encode the network weight and the weight gradient of each network layer to integer fixed-point data with a specified bit width; and calculating an adjusted network weight of each network layer using a preset optimization algorithm, according to an encoded network weight and an encoded weight gradient of each network layer.

After the weight gradient of each network layer is calculated, the network weight needs to be adjusted based on the weight gradient. An adjustment process mainly include a matrix addition. Specifically, optimization algorithms such as SGD (Stochastic Gradient Descent) are used to perform integer fixed-point encoding on the network weight and weight gradient, and the integer fixed-point data obtained by encoding is added, which is more efficient. The specific encoding process is (taking the encoding of network weight as an example):

Each scalar value in the network weight is encoded into the product of the parameter value sp representing the global dynamic range and the integer fixed-point value ip with a specified bit width, where sp=2E, E is a signed binary number with a bit width of EB, EB is a set bit width, and ip is a signed binary number with a bit width of IB, where IB is a bit width set according to a size of original floating-point data. The integer fixed-point value ip and the parameter value sp are calculated as:

$$ip = (-1)^s \sum_{i=0}^{IB-2} 2^i x_i \tag{6}$$

$$sp = 2^{(-1)^s \sum_{i=0}^{EB-2} 2^i x_i} \tag{7}$$

wherein s is the sign bit of the binary number x, which takes a value of 0 or 1, and $x_1$ is the value of the $i^{th}$ bit of the binary number x, which takes the value of 0 or 1.

The method for performing integer fixed-point encoding on the weight gradient is the same as encoding on the network weight, which will not be repeated here.

In one implementation of the embodiment of the present disclosure, before executing the step S302, the method provided by the embodiment of the present disclosure may further include the following steps: performing integer fixed-point encoding on the first activation, to encode the first activation into integer fixed-point data with a specified bit width; and determining whether the network layer is a convolution layer or a fully connected layer.

Correspondingly, the step S302 may specifically be: if the network layer is a convolution layer or a fully connected layer, performing power exponential domain fixed-point encoding on an encoded first activation and an encoded network weight, to encode the first activation and the network weight into power exponential domain fixed-point data.

In addition to the convolution layer and the fully connected layer, the neural network also includes a network layer that only performs the matrix addition, thus when performing the matrix addition, if the integer fixed-point data is directly used for operation, the operation efficiency of the hardware would be further improved. Therefore, before performing the power-exponential domain fixed-point encoding on the first activation, performing the integer fixed-point encoding on the first activation first, and determining whether the next network layer into which the first activation is to be inputted is a convolution layer or a fully connected layer. If it is a convolution layer or a fully connected layer, then the power exponential fixed-point encoding is performed on the first activation, for convolution such as matrix multiplication operations; if it is not a convolution layer or a fully connected layer, then the first activation is kept as the integer fixed-point data, directly for matrix addition operation.

In one implementation of the embodiment of the present disclosure, the step of performing integer fixed-point encoding on the first activation, to encode the first activation into integer fixed-point data with a specified bit width, may specifically be: encoding respectively each scalar value in the first activation into the product of the parameter value representing the global dynamic range and the integer fixed-point value with the specified bit width.

The method of performing integer fixed-point encoding on the first activation may be to encode each scalar value in the first activation into the product of the parameter value sp representing the global dynamic range and the integer fixed-point value ip with the specified bit width, where sp=2E, E is a signed binary number with a bit width of EB, EB is a set bit width, and ip is a signed binary number with a bit width of IB, where IB is a bit width set according to a size of original floating-point data. Ip and sp can be calculated according to formulas (6) and (7), which will not be repeated here.

Figure 9:
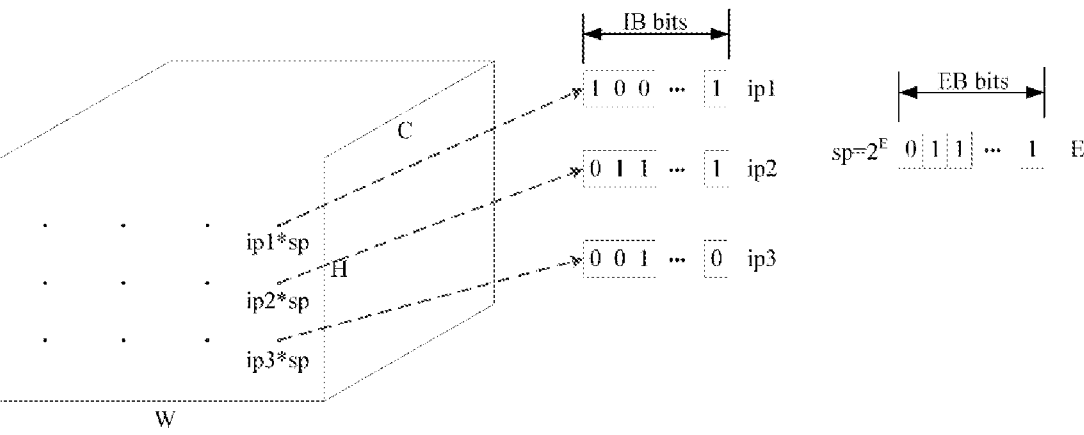
FIG. 9 is a schematic diagram of an integer fixed-point encoding method performed on an activation and each scalar value in a three-dimensional tensor of an activation gradient according to an embodiment of the present disclosure.

Yi and dYi are the activation and the activation gradient corresponding to the $i^{th}$ layer of the neural network model, and are three-dimensional tensors with a size of C×H×W. Each scalar value y or dy in the three-dimensional tensor Yi or dYi can be expressed as:

$$y = sp \cdot ip \tag{8}$$

$$dy = sp \cdot ip \tag{9}$$

wherein each three-dimensional tensor Yi or dYi shares one sp, and each scalar value y or dy corresponds to one integer fixed-point value ip. The encoding method of each scalar value in the activation and the activation gradient three-dimensional tensors is shown in FIG. 9.

Figure 10:
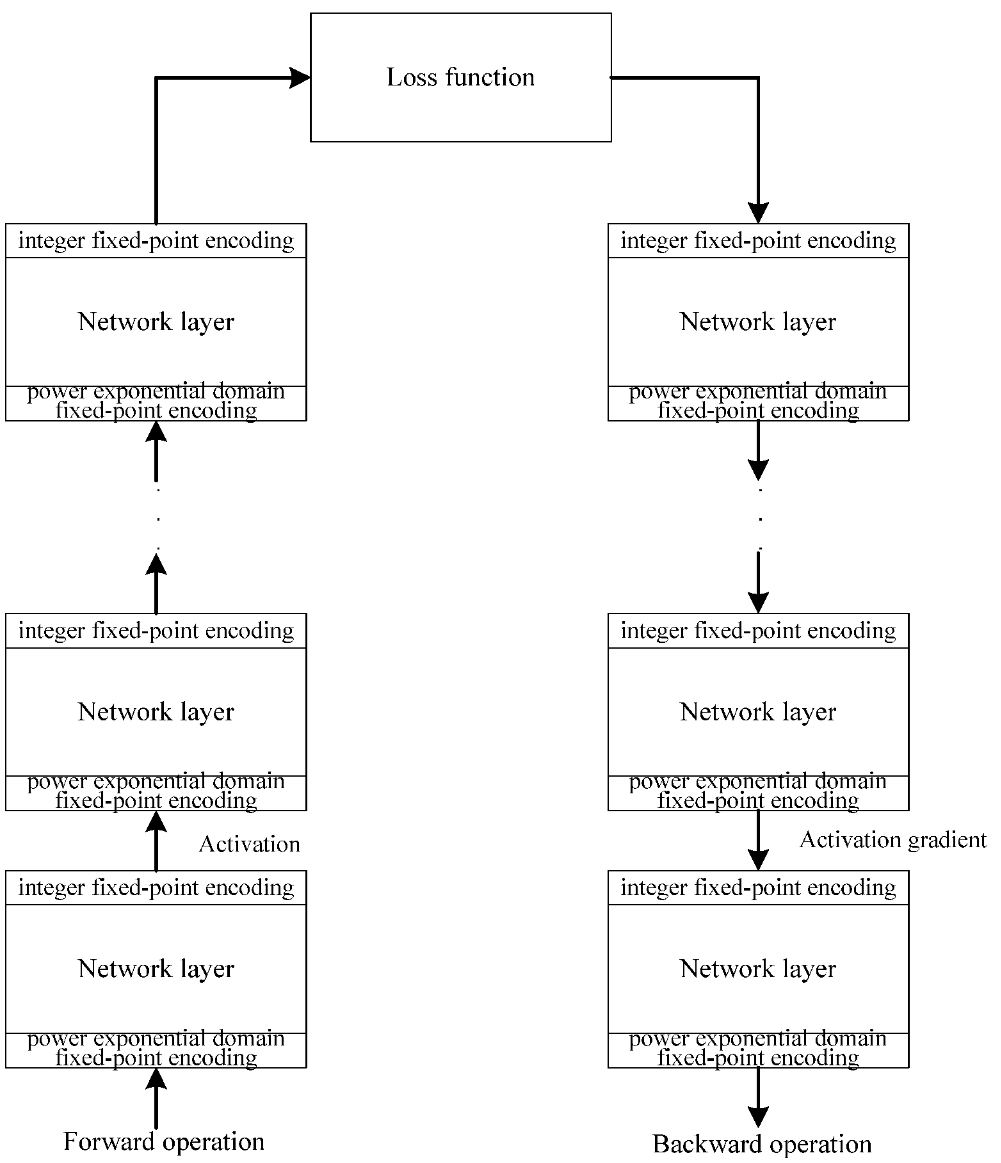
FIG. 10 is a schematic diagram of a data stream representation format of a forward operation and a backward operation of an encoded neural network according to an embodiment of the present disclosure.

FIG. 10 is a schematic diagram of a data stream representation format of a forward operation and a backward operation of an encoded neural network according to an embodiment of the present disclosure. The power exponential domain fixed-point encoding is performed on the activation inputted into each network layer, the integer fixed-point encoding is performed on the activation outputted by each network layer, and both the network weight or weight gradient are in the power exponential domain fixed-point encoding format. According to the present disclosure, both offline reasoning tasks and online training tasks of the neural network can be supported at the same time. It greatly reduces the resource overhead of the hardware device while ensuring the accuracy of model training, providing better underlying support for future end device reasoning/training applications.

By applying the embodiment of the present disclosure, a training sample is obtained, and a neural network model is trained using the training sample. When the neural network model is trained, following steps are respectively performed for each network layer in the neural network model: obtaining a first activation inputted into a network layer and a network weight of the network layer; performing power exponential domain fixed-point encoding on the first activation and the network weight, to encode the first activation and the network weight into power exponential domain fixed-point data; and calculating, according to an encoded first activation and an encoded network weight, a second activation outputted by the network layer. During training of the neural network model, the power exponential domain fixed-point encoding is performed on the first activation inputted into each network layer and the network weight of each network layer, and the encoded first activation and encoded network weight are power exponential domain fixed-point data, which when used in the operation, can cause a matrix multiplication operation involved to be converted into an addition operation in the power exponential domain by means of the power exponential domain encoding. The hardware resources required for the addition operation are significantly less than that required for the multiplication operation, which therefore can greatly reduce the hardware resource overhead required for running the neural network model.

For ease of understanding, the method for training the neural network model provided by the embodiment of the present disclosure will be described in combination with a specific scene where target recognition is performed from images.

First, an initial target recognition model, such as a convolution neural network model, is established. The target recognition model includes three convolution layers and one fully connected layer, and each network layer is set with initial network weights.

Then, a large number of sample images are obtained, in which target information is marked. A sample image is read out arbitrarily, and values (which are single-precision floating point data) of pixels in the sample image may be obtained. The sample image is inputted to the neural network model, and a model output result will be obtained, which specifically includes the following steps:

A. taking a first convolution layer as a current network layer, and taking the values of the pixels in the sample image as a first activation of the first convolution layer;

B. performing power exponential domain fixed-point encoding on the first activation, to encode the first activation into power exponential domain fixed-point data; obtaining a network weight of the current network layer, performing power exponential domain fixed-point encoding on the network weight of the current network layer, to encode the network weight of the current network layer into power exponential domain fixed-point data; inputting an encoded first activation into the current network layer, and performing, by the current network layer, an convolution operation on the encoded first activation by using an encoded network weight, to obtain a second activation outputted by the current network layer;

C. taking the second activation outputted by the current network layer as a first activation to be inputted into a next network layer, and returning to execute step B, until the last network layer, that is, the fully connected layer outputs a second activation. The second activation outputted by the fully connected layer is used as an output result of the target recognition model.

Next, by means of a loss function, the output result of the target recognition model is compared with the marked target information, to obtain a loss value. Then convolution operations and matrix multiplication operations are performed in turn from back to front according to the backward operation of above process, so as to obtain a weight gradient corresponding to each network layer, and the network weight is adjusted according to the weight gradient. By means of a continuous iterative process, the training of the target recognition model is realized.

Figure 11:
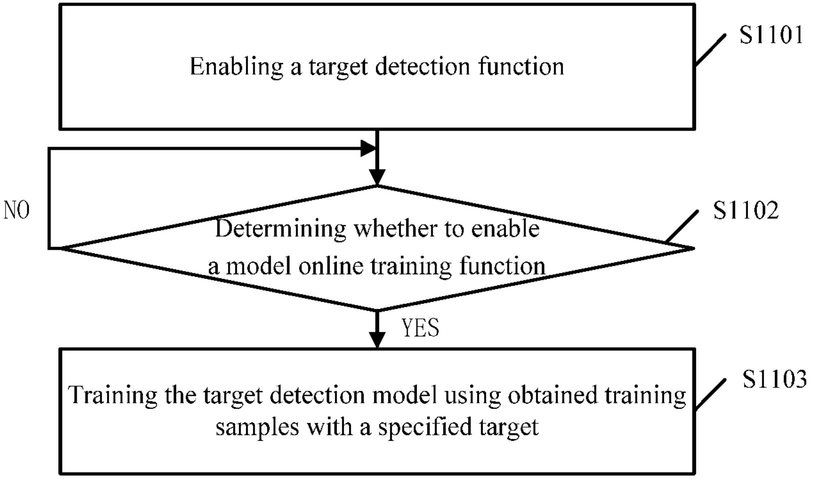
FIG. 11 is a schematic flowchart of a method for training a target detection model applied to a camera according to an embodiment of the present disclosure.

The above method for training the neural network model is mainly suitable for edge devices with limited resources, such as cameras. For cameras, the intelligent reasoning functions of cameras mainly include target detection, face recognition, etc. The target detection is taken as an example and the method for training the target detection model deployed on the cameras will be introduced, which mainly includes the following steps, as shown in FIG. 11:

S1101, enabling a target detection function.

The camera can enable the target detection function based on the user's selection result when the target detection is required according to actual needs of the user.

S1102, determining whether to enable a model online training function, and if it is determined that the model online training function is to be enabled, executing S1103, or waiting for enabling the model online training function.

Before using the target detection model for target detection, the target detection model needs to be trained. Whether to conduct online training can be selected by the user. Usually, only after the online training function is enabled, the camera may train the target detection model according to steps of the embodiment shown in FIG. 1.

S1103, training the target detection model using obtained training samples with a specified target.

When the target detection model is trained, the training sample inputted to the target detection model is a training sample with a specified target, so that the target detection model after training can detect the specified target. The specific method of training the target detection model may include:

In a first step, the training sample with the specified target is inputted to the target detection model, and a forward operation is performed on the training sample according to a sequence of network layers in the target detection model from front to back, to obtain a result of the forward operation of the target detection model. In performing the forward operation, for each network layer, the power exponential domain fixed-point encoding is performed respectively on the first activation inputted into the network layer and the network weight of the network layer, to encode the first activation and the network weight into power exponential domain fixed-point data, and a second activation outputted by the network layer is calculated according to an encoded first activation and an encoded network weight. A calculation is carried out by using the second activation as a first activation inputted into a next network layer until a second activation outputted by a last network layer is determined as the result of the forward operation.

In a second step, the result of the forward operation is compared with a preset nominal value to obtain a loss value.

In a third step, the loss value is inputted to the target detection model, and a backward operation is performed on the loss value according to a sequence of network layers in the target detection model from back to front, to obtain a weight gradient of each network layer in the target detection model. In performing the backward operation, for each network layer, the power exponential domain fixed-point encoding is performed respectively on the first activation and the first activation gradient inputted into the network layer, and the network weight of the network layer, to encode the first activation, the first activation gradient and the network weight into the power exponential domain fixed-point data, and a second activation gradient outputted by the network layer and the weight gradient are calculated according to an encoded first activation, an encoded first activation gradient and an encoded network weight. A calculation is carried out by using the second activation gradient as a first activation gradient inputted into a next network layer until the weight gradients of all network layers are calculated.

In a fourth step, the network weight of each network layer is adjusted according to the weight gradient of each network layer.

The above training process of the target detection model adopted by the camera is similar to the training process of the neural network model in the embodiment shown in FIG. 3. During the training process, the integer fixed-point encoding is performed on the first activation inputted into each network layer and the network weight of each network layer, and the encoded first activation and encoded network weight are integer fixed-point data with a specified bit width, which when used in the operation, cause the operation involved such as a matrix multiplication and a matrix addition, etc., to be performed in the integer fixed-point format. The bit width of the integer fixed-point data is significantly smaller than that of the single-precision floating point data, thus the hardware resource overhead of the camera can be greatly reduced. Online training of the target detection model on the camera enables the camera to have the function of scene adaptation.

Figure 12:
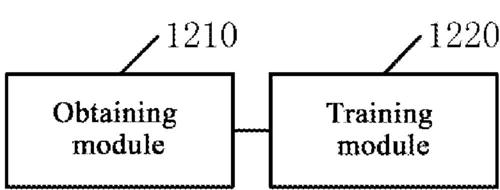
FIG. 12 is a schematic structural diagram of an apparatus for training a neural network model according to an embodiment of the present disclosure.

Corresponding to the above method embodiments, an embodiment of the present disclosure provides an apparatus for training a neural network model. As shown in FIG. 12, the apparatus may include:

- an obtaining module 1210 configured to obtain a training sample; and
- a training module 1220 configured to train a neural network model using the training sample, wherein, when training the neural network model, the following steps are respectively performed for each network layer in the neural network model: obtaining a first activation inputted into a network layer and a network weight of the network layer; performing power exponential domain fixed-point encoding on the first activation and the network weight, to encode the first activation and the network weight into power exponential domain fixed-point data; and calculating a second activation outputted by the network layer according to an encoded first activation and an encoded network weight.

In one implementation of the embodiment of the present disclosure, the training module 1220 can be specifically configured to input the training sample to the neural network model, and perform a forward operation on the training sample according to a sequence of network layers in the neural network model from front to back, to obtain a result of the forward operation of the neural network model. In performing the forward operation, for each network layer, the power exponential domain fixed-point encoding is performed respectively on the first activation inputted into the network layer and the network weight of the network layer, to encode the first activation and the network weight into power exponential domain fixed-point data, and a second activation outputted by the network layer is calculated according to an encoded first activation and an encoded network weight. A calculation is carried out by using the second activation as a first activation inputted into a next network layer until a second activation outputted by a last network layer is determined as the result of the forward operation. The training module 1220 can be specifically configured to compare the result of the forward operation with a preset nominal value to obtain a loss value. The training module 1220 can be specifically configured to input the loss value to the neural network model, and perform a backward operation on the loss value according to a sequence of network layers in the neural network model from back to front, to obtain a weight gradient of each network layer in the neural network model. In performing the backward operation, for each network layer, the power exponential domain fixed-point encoding is performed respectively on the first activation and the first activation gradient inputted into the network layer, and the network weight of the network layer, to encode the first activation, the first activation gradient and the network weight into the power exponential domain fixed-point data, and a second activation gradient outputted by the network layer and the weight gradient are calculated according to an encoded first activation, an encoded first activation gradient and an encoded network weight. A calculation is carried out by using the second activation gradient as a first activation gradient inputted into a next network layer until the weight gradients of all network layers are calculated. The training module 1220 can be specifically configured to adjust the network weight of each network layer according to the weight gradient of each network layer.

In one implementation of the embodiment of the present disclosure, the apparatus can be applied to a camera; the training sample can be a training sample with a specified target; and the neural network model can be a target detection model for detecting a specified target.

The training module 1220 can be specifically configured to input the training sample with the specified target to the target detection model, and perform a forward operation on the training sample according to a sequence of network layers in the target detection model from front to back, to obtain a result of the forward operation of the target detection model. In performing the forward operation, for each network layer, the power exponential domain fixed-point encoding is performed respectively on the first activation inputted into the network layer and the network weight of the network layer, to encode the first activation and the network weight into power exponential domain fixed-point data, and a second activation outputted by the network layer is calculated according to an encoded first activation and an encoded network weight. A calculation is carried out by using the second activation as a first activation inputted into a next network layer until a second activation outputted by a last network layer is determined as the result of the forward operation. The training module 1220 can be specifically configured to compare the result of the forward operation with a preset nominal value to obtain a loss value. The training module 1220 can be specifically configured to input the loss value to the target detection model, and perform a backward operation on the loss value according to a sequence of network layers in the target detection model from back to front, to obtain a weight gradient of each network layer in the target detection model. In performing the backward operation, for each network layer, the power exponential domain fixed-point encoding is performed respectively on the first activation and the first activation gradient inputted into the network layer, and the network weight of the network layer, to encode the first activation, the first activation gradient and the network weight into the power exponential domain fixed-point data, and a second activation gradient outputted by the network layer and the weight gradient are calculated according to an encoded first activation, an encoded first activation gradient and an encoded network weight. A calculation is carried out by using the second activation gradient as a first activation gradient inputted into a next network layer until the weight gradients of all network layers are calculated. The training module 1220 can be specifically configured to adjust the network weight of each network layer according to the weight gradient of each network layer.

In one implementation of the embodiment of the present disclosure, when the training module 1220 is configured to adjust the network weight of each network layer according to the weight gradient of each network layer, it may be specifically configured to: perform integer fixed-point encoding on the network weight and the weight gradient of each network layer, to encode the network weight and the weight gradient of each network layer to integer fixed-point data with a specified bit width; and calculate an adjusted network weight of each network layer using a preset optimization algorithm, according to an encoded network weight and an encoded weight gradient of each network layer.

In one implementation of the embodiment of the present disclosure, the training module 1220 may be further configured to: perform integer fixed-point encoding on the first activation, to encode the first activation into integer fixed-point data with a specified bit width; and determine whether the network layer is a convolution layer or a fully connected layer.

When the training module 1220 is configured to perform power exponential domain fixed-point encoding on the first activation and the network weight, to encode the first activation and the network weight into power exponential domain fixed-point data, it may be specifically configured to: if the network layer is a convolution layer or a fully connected layer, perform power exponential domain fixed-point encoding on an encoded first activation and an encoded network weight, to encode the first activation and the network weight into power exponential domain fixed-point data.

In one implementation of the embodiment of the present disclosure, when the training module 1220 is configured to perform integer fixed-point encoding on the first activation, to encode the first activation into integer fixed-point data with a specified bit width, it may be specifically configured to: encode respectively each scalar value in the first activation into the product of the parameter value representing the global dynamic range and the integer fixed-point value with the specified bit width.

In one implementation of the embodiment of the present disclosure, when the training module 1220 is configured to perform power exponential domain fixed-point encoding on the first activation and the network weight, to encode the first activation and the network weight into power exponential domain fixed-point data, it may be specifically configured to: encode each scalar value in the first activation and the network weight respectively into a product of a parameter value representing a global dynamic range and a power exponential domain fixed-point value.

In one implementation of the embodiment of the present disclosure, if the network layer is a convolution layer, then a size of the network weight is C×R×R×N, and for each scalar value in each three-dimensional tensor with a size of C×R×R, the corresponding parameter values are the same; if the network layer is a fully connected layer, then a size of the network weight is M×N, and for each scalar value in each column vector with a size of 1×N, the corresponding parameter values are the same; the parameter values corresponding to each scalar value in the first activation are the same.

By applying the embodiment of the present disclosure, a training sample is obtained, and a neural network model is trained using the training sample. When the neural network model is trained, following steps are respectively performed for each network layer in the neural network model: obtaining a first activation inputted into a network layer and a network weight of the network layer; performing power exponential domain fixed-point encoding on the first activation and the network weight, to encode the first activation and the network weight into power exponential domain fixed-point data; and calculating, according to an encoded first activation and an encoded network weight, a second activation outputted by the network layer. During training of the neural network model, the power exponential domain fixed-point encoding is performed on the first activation inputted into each network layer and the network weight of each network layer, and the encoded first activation and encoded network weight are power exponential domain fixed-point data, which when used in the operation, can cause a matrix multiplication operation involved to be converted into an addition operation in the power exponential domain by means of the power exponential domain encoding. The hardware resources required for the addition operation are significantly less than that required for the multiplication operation, which therefore can greatly reduce the hardware resource overhead required for running the neural network model.

Figure 13:
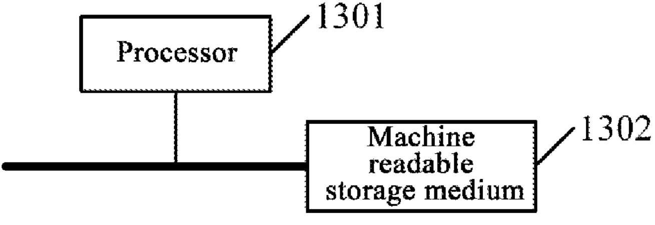
FIG. 13 is a schematic structural diagram of a computer device according to an embodiment of the present disclosure.

The embodiment of the present disclosure provides a computer device, as shown in FIG. 13. The computer device may include a processor 1301 and a machine readable storage medium 1302 storing machine executable instructions that can be executed by the processor 1301, which when executed by the processor, cause the processor to implement steps of the method for training the neural network model as described above.

The machine readable storage medium described above may include RAM (Random Access Memory), and may also include NVM (Non-Volatile Memory), for example, at least one disk storage. Optionally, the machine readable storage medium may also be at least one storage device located away from the processor described above.

The processor described above may be a general purpose processor, such as a CPU (Central Processing Unit), an NP (Network Processor), etc., it may also be a DSP (Digital Signal Processor), an ASIC (Application Specific Integrated Circuit), an FPGA (Field-Programmable Gate Array), or other programmable logic devices, discrete gates or transistor logic devices, discrete hardware components.

Data transmission can be carried out between the machine readable storage medium 1302 and the processor 1301 via a wired connection or a wireless connection, and the computer device can communicate with other devices through a wired communication interface or a wireless communication interface. FIG. 13 shows only an example of data transmission between the processor 1301 and the machine readable storage medium 1302 via a bus, and is not intended to limit the specific connection mode.

In the embodiment, the processor 1301 can read the machine executable instructions stored in the machine readable storage medium 1302 and run the machine executable instructions, so that a training sample is obtained, and a neural network model is trained using the training sample. When the neural network model is trained, following steps are respectively performed for each network layer in the neural network model: obtaining a first activation inputted into a network layer and a network weight of the network layer; performing power exponential domain fixed-point encoding on the first activation and the network weight, to encode the first activation and the network weight into power exponential domain fixed-point data; and calculating, according to an encoded first activation and an encoded network weight, a second activation outputted by the network layer. During training of the neural network model, the power exponential domain fixed-point encoding is performed on the first activation inputted into each network layer and the network weight of each network layer, and the encoded first activation and encoded network weight are power exponential domain fixed-point data, which when used in the operation, can cause a matrix multiplication operation involved to be converted into an addition operation in the power exponential domain by means of the power exponential domain encoding. The hardware resources required for the addition operation are significantly less than that required for the multiplication operation, which therefore can greatly reduce the hardware resource overhead required for running the neural network model.

The embodiment of the present disclosure further provides a machine readable storage medium storing machine executable instructions, which when invoked and executed by a processor, cause the processor to implement the steps of the method for training the neural network model as described above.

In the embodiment, the machine readable storage medium stores machine executable instructions for implementing at runtime the steps of the method for training the neural network model provided by the embodiment of the present disclosure, so that a training sample is obtained, and a neural network model is trained using the training sample. When the neural network model is trained, following steps are respectively performed for each network layer in the neural network model: obtaining a first activation inputted into a network layer and a network weight of the network layer; performing power exponential domain fixed-point encoding on the first activation and the network weight, to encode the first activation and the network weight into power exponential domain fixed-point data; and calculating, according to an encoded first activation and an encoded network weight, a second activation outputted by the network layer. During training of the neural network model, the power exponential domain fixed-point encoding is performed on the first activation inputted into each network layer and the network weight of each network layer, and the encoded first activation and encoded network weight are power exponential domain fixed-point data, which when used in the operation, can cause a matrix multiplication operation involved to be converted into an addition operation in the power exponential domain by means of the power exponential domain encoding. The hardware resources required for the addition operation are significantly less than that required for the multiplication operation, which therefore can greatly reduce the hardware resource overhead required for running the neural network model.

The embodiment of the present disclosure further provides a computer program product for implementing at runtime the steps of the method for training the neural network model described above.

The embodiments described above may be implemented in whole or in part in software, hardware, firmware, or any combination thereof. When implemented in software, it may be implemented in whole or in part in the form of a computer program product. The computer program product includes one or more computer instructions. The processes or functions described in accordance with the embodiments of the present disclosure is produced in whole or in part, when the computer program instructions are loaded and executed on a computer. The computer may be a general-purpose computer, a dedicated computer, a computer network, or other programmable devices. The computer instructions may be stored in a computer-readable storage medium or may be transmitted from one computer-readable storage medium to another computer-readable storage medium, for example, the computer instructions may be transmitted from a web site, a computer, a server, or a data center to another web site, another computer, another server, or another data center via a cable (such as a coaxial cable, an optical fiber, a DSL (Digital Subscriber Line)) or wireless (such as infrared, wireless, microwave, etc.). The computer-readable storage medium may be any available medium that may be accessed by a computer or a data storage device such as a server or a data center containing one or more available medium integrations. The available media may be magnetic media (such as floppy disks, hard disks, magnetic tapes), optical media (such as Digital Versatile Discs (DVD)), or semiconductor media (such as Solid State Disk (SSD)), etc.

It should be noted that, for embodiments of the apparatus, electronic device, computer readable storage medium, and computer program product, since they are substantially similar to the embodiments of the method, their description is relatively simple, and for related aspects, one only needs to refer to portions of the description of the method embodiments.

Moreover, terms “include”, “comprise” or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences “comprise(s) a” or “include(s) a” do not exclude that there are other identical elements in the processes, methods, articles, or devices which include these elements.

It will be understood by those of ordinary skills in the art that all or some of the steps in the methods described above may be accomplished by instructing the associated hardware by a program. Said program may be stored on a computer-readable storage medium, such as ROMs/RAMs, magnetic disks, optical disks, etc.

The embodiments described above are merely preferred embodiments of the present disclosure, and not intended to limit the scope of the present disclosure. Any modifications, equivalents, improvements or the like within the spirit and principle of the disclosure should be included in the scope of the disclosure.

What is claimed is:

1. A method for training a neural network model, wherein the neural network model is a target detection model and the method is applied to target detection and performed by a camera on which the target detection model is deployed, wherein the camera includes a processor and a machine-readable storage medium, the processor of the camera, by reading machine-executable instructions stored in the machine-readable medium and executing the machine-executable instructions, implements the following operations comprising:

enabling a target detection function;

enabling a model online training function;

obtaining a training sample, wherein the training sample is a face sample or a vehicle sample; and training the neural network model using the training sample; wherein, when training the neural network model, for each network layer in the neural network model, following steps are respectively executed:

obtaining a first activation inputted into the network layer and a network weight of the network layer;

performing integer fixed-point encoding on the first activation, to encode the first activation into integer fixed-point data with a specified bit width; and determining whether the network layer is a convolution layer or a fully connected layer;

if the network layer is the convolution layer or the fully connected layer, performing power exponential domain fixed-point encoding on the encoded first activation and the network weight, to encode the first activation and the network weight into power exponential domain fixed-point data, comprising: encoding each scalar value in the first activation and the network weight respectively into a product of a parameter value sp representing a global dynamic range and a power exponential domain fixed-point value ep, where sp=2E, E is a signed binary number with a bit width of EB, EB is a set bit width, and ep is a signed binary number with a bit width of IB, which consists of one sign bit, an exponent bit and a fraction bit; IB is a bit width set according to a size of original floating-point data; the unit of bit width is Bit;

$$ep = (-1)^s 2^{Exponent} 2^{Fraction} \quad (1)$$

$$sp = 2^{(-1)^s \sum_{i=0}^{EB-2} 2^i x_i} \quad (2)$$

wherein s is a sign bit of a binary number x, which takes a value of 0 or 1, $x_i$ is a value of the $i^{th}$ bit of the binary number x, which takes the value of 0 or 1, Exponent is a binary number of the exponent bit, and Fraction is a binary number of the fraction bit; and calculating a second activation outputted by the network layer according to an encoded first activation and an encoded network weight obtained by performing the power exponential domain fixed-point encoding;

if the network layer is not the convolution layer or the fully connected layer, keeping the first activation obtained by the integer fixed-point encoding as the integer fixed-point data directly for matrix addition operations and performing the matrix addition operations to generate the second activation outputted by the network layer, wherein training the neural network model using the training sample comprises:

inputting the training sample to the neural network model, and performing a forward operation on the training sample according to a sequence of network layers in the neural network model from front to back, to obtain a result of the forward operation of the neural network model; wherein when performing the forward operation, for each network layer, the power exponential domain fixed-point encoding is performed respectively on the first activation inputted into the network layer and the network weight of the network layer, to encode the first activation and the network weight into the power exponential domain fixed-point data; the second activation outputted by the network layer is calculated according to the encoded first activation and the encoded network weight obtained by performing the power exponential domain fixed-point encoding; and a calculation is carried out by using the second activation as a first activation inputted into a next network layer until a second activation outputted by a last network layer is determined as the result of the forward operation;

comparing the result of the forward operation with a preset nominal value to obtain a loss value;

inputting the loss value to the neural network model, and performing a backward operation on the loss value according to a sequence of network layers in the neural network model from back to front, to obtain a weight gradient of each network layer in the neural network model; wherein when performing the backward operation, for each network layer, the power exponential domain fixed-point encoding is performed respectively on the first activation and a first activation gradient inputted into the network layer, and the network weight of the network layer, to encode the first activation, the first activation gradient and the network weight into the power exponential domain fixed-point data, a second activation gradient outputted by the network layer and the weight gradient are calculated according to the encoded first activation, the encoded first activation gradient and the encoded network weight obtained by performing the power exponential domain fixed-point encoding, and a calculation is carried out by using the second activation gradient as a first activation gradient inputted into a next network layer until the weight gradients of all network layers are calculated; and adjusting the network weight of each network layer according to the weight gradient of each network layer.

2. The method of claim 1, wherein adjusting the network weight of each network layer according to the weight gradient of each network layer comprises:

performing integer fixed-point encoding on the network weight and the weight gradient of each network layer, to encode the network weight and the weight gradient of each network layer to the integer fixed-point data with the specified bit width; and calculating an adjusted network weight of each network layer using a preset optimization algorithm, according to the encoded network weight and the encoded weight gradient of each network layer obtained by performing the integer fixed-point encoding.

3. The method of claim 1, wherein performing the integer fixed-point encoding on the first activation, to encode the first activation into the integer fixed-point data with the specified bit width comprises:

encoding each scalar value in the first activation respectively into a product of a parameter value representing a global dynamic range and an integer fixed-point value with the specified bit width.

4. The method of claim 1, wherein if the network layer is the convolution layer, a size of the network weight is C×R×R×N, and for each scalar value in each three-dimensional tensor with a size of C×R×R, corresponding parameter values are the same, wherein C represents a dimension size of a convolution kernel in a direction of an input channel, R represents a dimension size of a space of the convolution kernel, and N represents a dimension size of the convolution kernel in a direction of an output channel;

if the network layer is the fully connected layer, the size of the network weight is M×N, and for each scalar value in each vector with a size of 1×N, corresponding parameter values are the same, wherein M represents rows of a matrix and N represents columns of the matrix;

parameter values corresponding to each scalar value in the first activation are the same.

5. A camera, comprising a processor and a machine readable storage medium, wherein the machine readable storage medium stores machine executable instructions that can be executed by the processor, which when executed by the processor, cause the processor to implement the method of claim 1.

6. A non-transitory machine readable storage medium with machine executable instructions stored thereon, which when invoked and executed by a processor, cause the processor to implement the method of claim 1.

* * * * *